United States Patent [19]

Domitter

[11] 4,186,595
[45] Feb. 5, 1980

[54] BRAKE TESTING APPARATUS

[75] Inventor: Erich Domitter, Warren, Mich.

[73] Assignee: Dominion Tool & Die Company, Inc., Roseville, Mich.

[21] Appl. No.: 940,822

[22] Filed: Sep. 8, 1978

[51] Int. Cl.² .............................................. G01L 5/28
[52] U.S. Cl. ..................................................... 73/132
[58] Field of Search ............................. 73/132, 141 A

[56] References Cited

U.S. PATENT DOCUMENTS

| 3,662,593 | 5/1972 | Pirrello et al. | 73/132 |
| 3,771,359 | 11/1973 | Shoberg | 73/141 A |
| 3,995,475 | 12/1976 | Cline | 73/132 X |

*Primary Examiner*—Jerry W. Myracle
*Attorney, Agent, or Firm*—Harness, Dickey and Pierce

[57] ABSTRACT

Two embodiments of a testing device for testing the hydraulic braking system of a motor vehicle. Each embodiment includes a supporting portion that is adapted to be fixed relative to a component of the vehicle in proximity to the brake pedal, such as the steering column and a force applying portion that is adapted to apply pressure to the brake pedal. Sensing means are provided that sense both the pressure applied to the brake pedal and the degree of travel of the brake pedal during a given time period.

6 Claims, 6 Drawing Figures

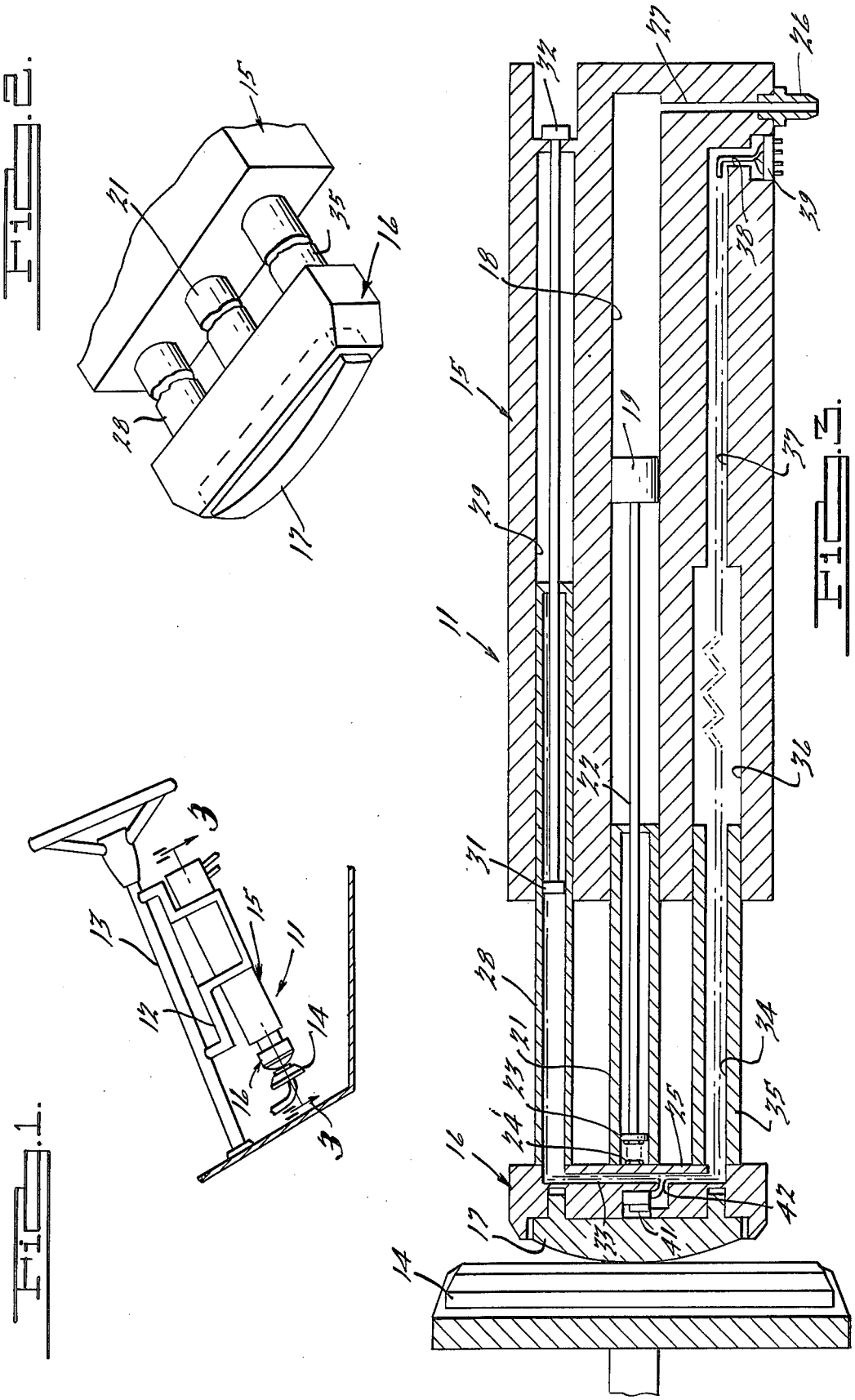

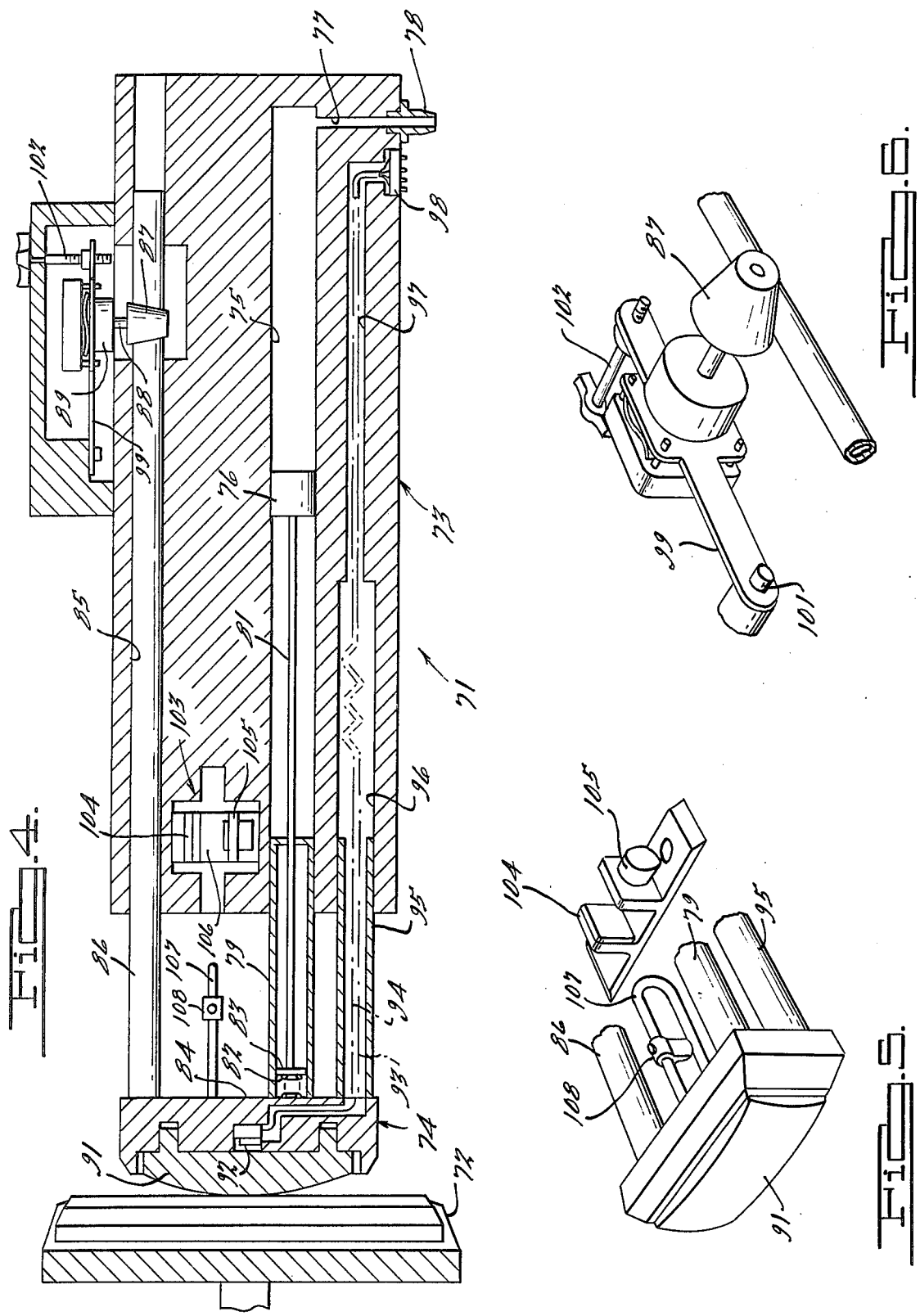

BRAKE TESTING APPARATUS

BACKGROUND OF THE INVENTION

This invention relates to a testing device, and more particularly, to an improved brake testing device.

In automotive assembly lines it is desirable to provide a device for testing the hydraulic brake circuit before the vehicle is driven. Although brake testing can be done manually by an inspector, such methods do not afford a high degree of accuracy and, more particularly, such testing methods do not sense the presence of slow leaks in the hydraulic circuit.

It is, therefore, a principle object of this invention to provide an improved and compact device for testing the brakes of a motor vehicle.

It is another object of this invention to provide a brake testing device which affords high accuracy and which can sense slow leaks.

SUMMARY OF THE INVENTION

This invention is adapted to be embodied in a testing device for a pedal-operating system. The testing device comprises a supporting portion that is adapted to be fixed against movement relative to the pedal, and a force applying portion that is supported for movement by the supporting portion into engagement with the pedal. Power means are incorporated for moving the force applying portion relative to the supporting portion for applying a force to the pedal. Sensing means are carried by the force applying means for sensing a condition of the pedal and the related system.

BRIEF DESCRIPTION OF THE DRAWINGS

FIG. 1 is a side elevational view of a portion of a motor vehicle showing a brake testing apparatus constructed in accordance with a first embodiment of the invention.

FIG. 2 is an enlarged perspective view of the embodiment shown in FIG. 1 and illustrates the portion of the testing apparatus that is disposed in proximity to the pedal.

FIG. 3 is an enlarged cross-sectional view taken generally along the line 3—3 of FIG. 1.

FIG. 4 is a cross-sectional view, in part, similar to FIG. 3 showing another embodiment of the invention.

FIG. 5 is an enlarged perspective view showing the nose piece and home senser of the embodiment of FIG. 4.

FIG. 6 is a broken away perspective view, on an enlarged scale, showing the travel senser of the embodiment of FIGS. 4 and 5.

DETAILED DESCRIPTION OF THE PREFERRED EMBODIMENTS

The Embodiment of FIGS. 1-3

Referring first to FIG. 1, a brake testing device constructed in accordance with a first embodiment of this invention is identified generally by the reference numeral 11. The brake testing device 11 is particularly adapted for testing the brake system in a motor vehicle, particularly on an assembly line. For this purpose, the testing device 11 is provided with an attachment bracket 12 by which it may be fixed to a steering column mast 13 of the vehicle to be tested in proximity to the brake pedal 14.

Referring now additionally to FIGS. 2 and 3, the brake testing device 11 includes a supporting housing indicated generally by the reference numeral 15, and a force applying portion indicated generally by the reference numeral 16. The force applying portion 16 is supported for sliding movement relative to the supporting portion 15, in a manner to be described, and carries a nose piece 17 that is adapted to engage the brake pedal 14.

The supporting portion 15 is formed with a longitudinally extending bore 18 in which a piston 19 is slidably supported. The force applying portion 16 also includes a tubular member 21 that extends into the bore 18 for slidably supporting the force applying portion 16 relative to the supporting portion 15. The piston 19 is affixed to a piston rod 22 that extends through the tubular portion 21 and has an end plate 23 that bears against a compression spring 24. The spring 24, in turn, bears against a rear surface 25 of the force applying portion 16. A fitting 26 is provided in communication with a passage 27 that intersects the bore 18 for selectively applying fluid pressure to the right end side of the piston 19, as shown in FIG. 3, or for withdrawing this pressure so as to reciprocate the force applying portion 16 relative to the supporting portion 15. This change in pressure may be achieved in any known manner, preferably under the control of a master computer with which the brake testing device 11 is used.

A tubular member 28 is affixed to the force applying portion 16 and extends into a bore 29 of the supporting portion 15. The bore 29 is parallel to the bore 18, and this construction also assists in the sliding support for the force applying portion 16. Linear electrical transducer 31 is positioned within the tubular member 28 and has one of its contacts fixed relative to the supporting portion 15, as at 32. The linear transducer 31, which may be a sliding rheostat, provides an output signal indicative of the position of the force applying member 16 relative to the supporting member 15. The electrical leads 33 from the transducer 31 extend through the force applying portion 16 and exit via a conductor 34 that passes through a tubular member 35 that is also fixed to the force applying portion 16. The tubular member 35 is supported within a bore 36 of the supporting portion 15. A smaller bore 37 is found at the base of the bore 36 and is intersected by a transverse passage 38 so that the conductor 34 may be connected to an appropriate terminal block 39. The terminal block 39 affords an electrical connection with the computer (not shown) with which the testing apparatus 15 is used.

The nose piece 17 is supported for limited longitudinal or sliding movement relative to the force applying portion 16 and a strain gauge 41 is positioned between the nose piece 17 and force applying portion 16 so as to provide a signal indicative of the force applied to the pedal 14. A suitable conductor 42 extends from the strain gauge 41 through the tubular member 35 and bore 37 and terminates at appropriate prongs of the terminal block 39.

The brake testing device 15 cooperates with the computer for testing the braking system of the vehicle in the manner now to be described. Once the testing device 15 is appropriately positioned on the mast 13, the testing signal is initiated. Hydraulic pressure is applied to the bore 18 in a predetermined magnitude so as to drive the piston 19 to the left. This will drive the force applying portion 16 to the left through the extended spring 24 until the nose piece 17 contacts the pedal 14. When this occurs, a spring (not shown) in the nose piece 17 will compress and the strain gauge 41 will provide a signal to the associated computer indicating that contact with the brake pedal has been made.

If desired, at this time the linear transducer 31 will provide a signal indicative of the point at which travel of the pedal 14 is initiated. Pressure is applied to the bore 18 so as to cause the brake pedal 14 to be depressed and actuate the hydraulic system of the associated brakes. When the brakes of the vehicle are all applied, a suitable increase in pressure will be sensed by the strain gauge 41. Simultaneously, the movement of the pedal 14 will be indicated by the linear transducer 31 which compares, through the associated computer the initial travel with the point at which the brakes become fully engaged.

Pressure is then maintained at a predetermined rate in the bore 18 so as to hold the vehicle brakes on for a predetermined time period. If the linear transducer 31 indicates further movement of the pedal 14 of sufficient magnitude as to be indicative of a leak in the hydraulic circuit, the computer will send an appropriate warning signal.

It is to be understood that the proposed test sequence is one of many that may be used in conjunction with the described apparatus and that various other test sequences will present themselves to those skilled in the art.

After the test cycle is completed, the pressure in the bore 18 is relieved so as to draw the piston 19 to the right as seen in FIG. 3. The testing device 11 is then dismounted from the mast 13 for installation for the next vehicle to be tested.

The Embodiment of FIGS. 4-6

A brake testing apparatus constructed in accordance with another embodiment of this invention is identified generally by the reference numeral 71. The testing apparatus 71 is adapted to be used in substantially the same manner as in the previously described embodiment, and for this reason, a view corresponding to FIG. 1 of this embodiment has not been made. It is to be understood, however, that the testing device 71 is installed in a manner similar to that described, that is, the unit 71 is suspended from the steering mast in juxtaposition to a brake pedal 72.

The testing device 71 is comprised of a support portion indicated generally by the reference numeral 73 and a force applying portion indicated generally by the reference numeral 74. The supporting portion 73 is formed with a longitudinally extending bore 75, in which a piston 76 is supported for reciprocation. The bore 75 is intersected by a fluid passage 77 that terminates in a fitting 78 so as to selectively pressurize or withdraw fluid from the bore 75 under the control of a computer (not shown). The force applying portion 74 has affixed to its face a tubular member 79 that is slidably supported within the bore 75. The piston 76 is connected to a piston rod 81 that extends into the tubular member 79 and engages a compression spring 82 that is interposed between a head 83 of the piston rod and a rear surface 84 of the force applying member 74. Pressurization of the bore 75 causes the force applying portion 74 to move into engagement with the brake pedal 72 as in the previously described embodiment.

Paralleling the bore 75 is a second bore 85 that slidably supports a shaft 86 that is fixed to the rear surface of the force applying portion 74. The shaft 86 is engaged by a conical friction member 87 that is affixed to a shaft 88 of a rotary encoder or pulse generator 89. Reciprocation of the shaft 86 drives the rotary encoder 89 through the friction member 87 and provides an output signal indicative of the travel of the force applying member 74. The rotary encoder 89 and associated drive, therefore, replace the linear transducer 31 of the preceding embodiment.

The force applying portion 74 has a nose piece 91 that is movable relative to the remaining portion of the force applying portion 74. As in the preceding embodiment, a strain gauge 92 is positioned so as to sense the limited relative movement of the nose piece 91 to provide a pressure indication. Conductors 93 and 94 extend from the strain gauge 92 through a tubular member 95 that is affixed to the rear surface 84 of the force applying portion 74. The tubular member 95 is slidably supported in a bore 96 of the supporting portion 73, which bore is parallel to the bores 75 and 85. The conductors 93 and 94 extend through the bore 96 and through a smaller passage 97 and terminate at a terminal block 98 that affords a connection to the associated computer (not shown).

The support for the rotary encoder 89 may be best understood by reference to the perspective view of FIG. 6. In order to permit proper functioning of the friction drive afforded by the member 87, the rotary encoder 89 is supported on a plate 99 that is journalled on a pivot pin 101. An adjustment screw 102 is threaded into a complementary opening in the inner end of the plate 99 and is accessible through outer surface of the supporting portion 73 as may be seen in FIG. 4.

In order to provide an indication of a home position, a sensing device indicated generally by the reference numeral 103 is positioned in the supporting portion 73 between the bores 75 and 85. The sensing device includes a photocell receiver 104 and light emitting diode 105. The light emitting diode 105 and photocell receiver 104 are spaced apart by an air gap 106. A generally U-shaped bracket 107 is affixed to the rear face 84 of the force applying member and a signal flag 108 is adjustably supported on the member 107. When the force applying portion 74 is appropriately retracted, the flag 108 will enter the air gap 106 and interrupt the light passage from the light emitting diode 105 to the photocell receiver 104. Thus, a signal may be transmitted to the associated computer indicating that the device is in its home position.

The embodiment of FIGS. 4-6 operates as in the preceding embodiment and, as with that embodiment, is susceptible of a variety of uses depending upon the associated computer program. For this reason, a description of a typical test sequence will not be repeated.

It is to be understood that the foregoing description is that of two preferred embodiments of the invention and that various changes and modifications may be made without departing from the spirit and scope of the invention, as defined by the appended claims.

What is claimed is:

1. A testing device for a pedal operated system comprising a supporting housing adapted to be fixed against movement relative to the pedal, a force applying portion supported for movement by said supporting housing into engagement with the pedal, power means within said housing for moving said force applying portion relative to said supporting portion for applying a force to the pedal, distance sensing means within said housing for sensing the distance of travel of said force applying portion relative to the supporting housing and force sensing means carried by said force applying portion for sensing the force applied to said pedal.

2. A testing device as set forth in claim 1 wherein the force applying portion has a nose piece adapted to engage the pedal and another piece supporting said nose piece, the force sensing means comprising a strain gauge positioned between said pieces.

3. A testing device as set forth in claims 1 or 2 wherein the distance sensing means comprises a rheostat.

4. A testing device as set forth in claim 1 wherein the supporting housing is formed with a first, longitudinally extending bore, the power means comprising a piston slidably supported in said first bore and operative to apply a force to the force applying portion, said force applying portion having a tubular part affixed thereto and slidably supported in said bore, there being a second bore in said supporting housing parallel to said first bore, said force applying portion having a second tubular part slidably supported in said second bore.

5. A testing device as set forth in claim 4 wherein the distance sensing means is responsive to the movement of the second tubular part relative to the supporting housing.

6. A testing device as set forth in claims 1 or 2 wherein the distance sensing means comprises a rotary encoder.

* * * * *